United States Patent [19]

Belokin, Jr.

[11] 4,200,346
[45] Apr. 29, 1980

[54] PORTABLE AND NESTABLE STORAGE BIN

[76] Inventor: Paul Belokin, Jr., Rte. 4, Hayward, Wis. 54843

[21] Appl. No.: 951,374

[22] Filed: Oct. 16, 1978

[51] Int. Cl.$^2$ ............................................. A47F 3/14
[52] U.S. Cl. .................................... 312/351; 312/229; 312/250; 211/126; 206/518
[58] Field of Search ................ 312/118, 351, 42, 183, 312/229, 239, 250; 108/91; 211/188, 126; 150/0.5; 206/518

[56] References Cited

U.S. PATENT DOCUMENTS

| 648,668 | 5/1900 | Kreider | 312/351 |
|---|---|---|---|
| 1,676,356 | 7/1928 | Sapinsley | 312/42 |
| 2,520,064 | 8/1950 | Rones | 312/229 |
| 2,760,207 | 8/1956 | Glintz | 312/250 |
| 2,776,691 | 1/1957 | Tupper | 150/0.5 |
| 3,425,594 | 2/1969 | Bridenstine | 211/126 |
| 3,581,932 | 4/1969 | Kreeger | 211/126 |
| 3,698,783 | 10/1972 | Swett et al. | 312/229 |
| 3,712,667 | 1/1973 | Weber | 312/250 |
| 3,739,939 | 6/1973 | Koenig | 206/518 |
| 4,099,627 | 7/1978 | Strada | 211/188 |

Primary Examiner—Victor N. Sakran
Attorney, Agent, or Firm—James E. Nilles

[57] ABSTRACT

A portable and stackable storage bin fabricated from lightweight insulating material such as polystyrene and which is rendered portable by a removable caster ring assembly in the bottom thereof. The bin has removable shelves for accommodating produce or the like and also includes a removable cover tray for the display of produce and also for the purpose of strengthening the upper portion of the bin to prevent distortion of the bin.

10 Claims, 6 Drawing Figures

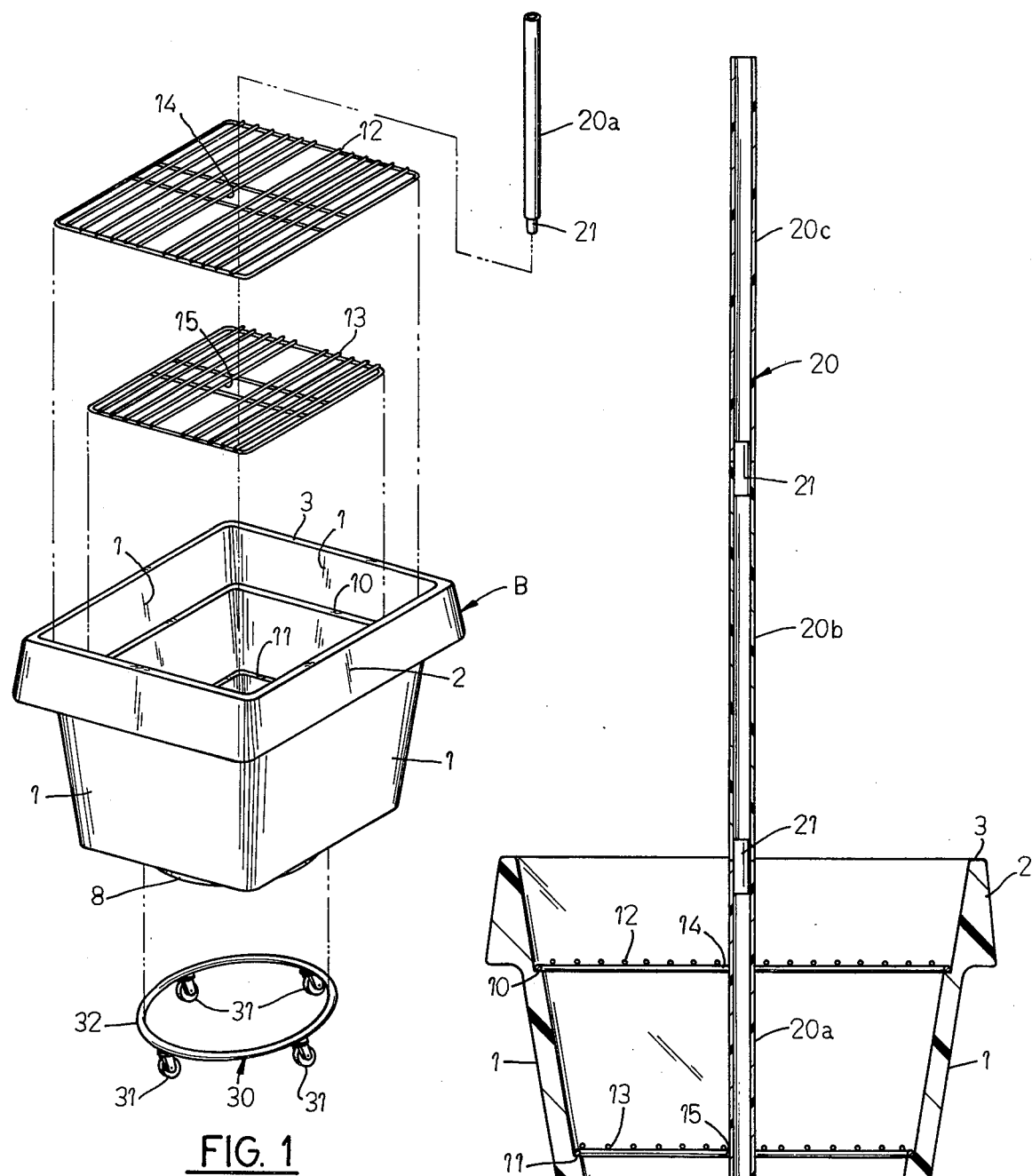
FIG. 1
FIG. 2
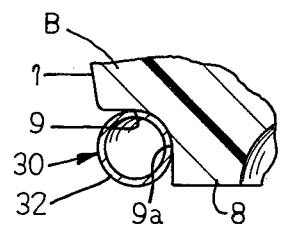
FIG. 6

PORTABLE AND NESTABLE STORAGE BIN

BACKGROUND OF THE INVENTION

The present invention relates to portable storage bins for supermarkets or the like by means of which produce or other goods can be rendered portable throughout the store and conveyed from a refrigerated area, shelves, or check-out area and provides for ascessible and predominant display of the goods. Many storage bins have been proposed for this purpose but have not been entirely suitable due to the large size required, the necessity for storing the bins in a small area, the lack of rendering the bins, particularly when loaded mobile, and the lack of sgtrength of such bins when they are necessarily formed of lightweight and inexpensive material and which strength is necessary when the bins are loaded, particularly if they are to be refrigerated by ice.

Examples of some prior art bins of this general character are shown in the following U.S. Pats.: No. 3,659,742 issued May 2, 1977 shows a leak-proof stackable container of insulated material formed of plastic for storing perishable foods mixed with ice. The container has a lid with a centrally located recess of a size to receive a well of a second container stacked thereon. U.S. Pat. No. 2,768,677 shows a container for foods or the like and formed of polyethylene or polystyrene material and is nestable and has a thicker bottom wall for reinforcing. U.S. Pat. No. 2,767,755 shows a box-like container having nesting characteristics and having corner posts to support an adjacent container.

SUMMARY OF THE PRESENT INVENTION

The present invention provides a portable, lightweight and stackable storage bin fabricated by molding from a lightweight, rigid and insulating material such as polystyrene, the bin having a plurality of removable shelves therein for accommodating produce or other material to be displayed depending on the capacity of the bin desired. The invention also contemplates the use of a removable caster assembly on which the bin can be easily and quickly installed or removed and thereby rendered portable to various strategic locations in the store or other areas where it is used or by means of which a loaded bin can be moved to or from an overnight refrigerated storage area. The invention furthermore contemplates the use of a removable cover tray for reinforcing the upper portion of the bin against lateral expansion and ultimate breakage when the bin is loaded with produce and/or ice. Drainage means is provided for the removable cover tray and also for the bin in general and a valve located at the bottom of the bin permits drainage of the water from the bin at the appropriate place and time. Removable display means are also provided in the form of a knock-down display post that can extend through the cover tray, the removable shelves, and is removably inserted in the bottom of the bin. The entire portable bin can be completely and quickly disassembled for complete cleaning of all of the components and for easy and compact storage thereof.

These and other objects and advantages of the present invention will appear hereinafter as this disclosure progresses, reference being had to the accompanying drawings.

BRIEF DESCRIPTION OF THE DRAWINGS

FIG. 1 is an exploded, perspective view of the storage bin provided by the present invention, certain parts being removed for the sake of clarity;

FIG. 2 is a side elevational, vertical sectional view of the bin shown in FIG. 1, but in an assembled position;

FIG. 6 is an enlarged, fragmentary, sectional view of the lower corner portion of the bin shown in FIG. 2.

DESCRIPTION OF A PREFERRED EMBODIMENT

Figure 4:
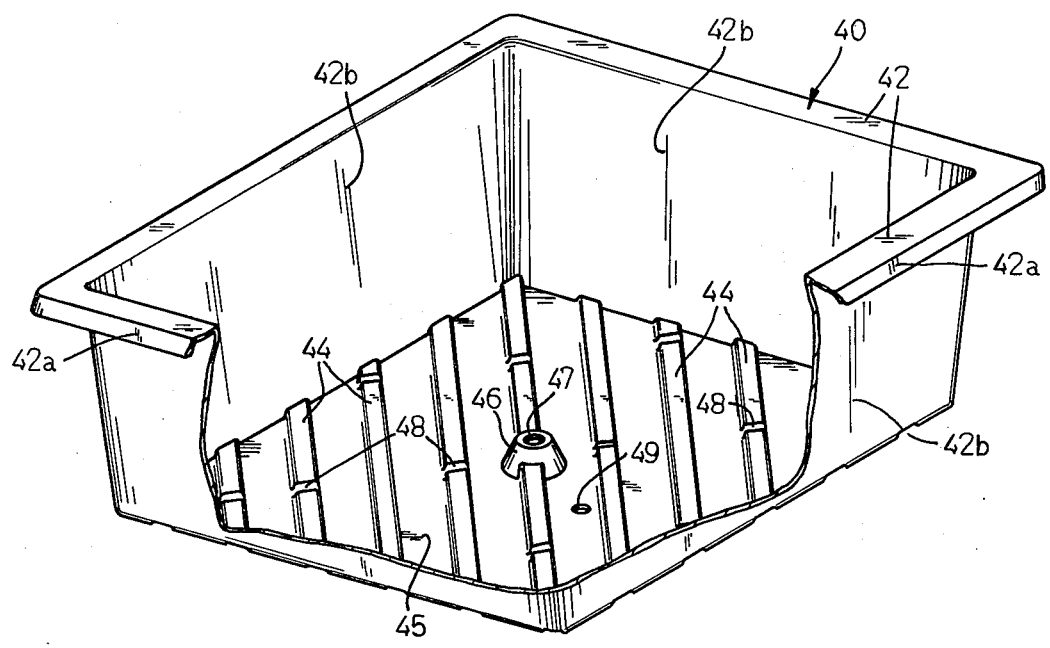
FIG. 4 is a perspective view of the cover tray for the bin shown in FIG. 3, but on an enlarged scale, the view being taken generally from the upper side of the tray and at one corner thereof.

The storage bin provided by the present invention is molded as a singel piece from a lightweight, insulating material which is rigid and strong for its weight, such as expandable polystyrene which is also waterproof. The bin B is formed with side wall means 1 which is tapered in a downwardly converging direction whereby the lower portion of the bin is smaller than its upper portion, thus providing a compact nesting arrangement considering the over-all size of the bins. The bin also has an integrally molded thicker reinforcing portion 2 around its upper edge which terminates in an upper edge 3.

The bin also includes a closed bottom 6 having upwardly facing and generally centrally located opening 7 formed in its interior surface. The bottom 6 also has wheel mounting means on the underside thereof in the form of a downwardly and outwardly facing annular recess 8 (FIG. 6). The recess defines generally horizontal flange 9 and a generally vertical cylindrical shoulder 9a formed around the periphery of the bottom. Futhermore, the side wall means of the bin have a plurality of interior inwardly turned shoulders 10 and 11 at vertically spaced locations in the bin.

Removable racks 12 and 13 can be inserted in the bin and rest on their respective shoulders 10 and 11 so as to form shelves on which produce or other material can be placed. The number of such shelves being variable depending on the holding capacity for produce desired for the bin. The removable racks are preferably fabricated from metal rods welded together and are plated to make them rustproof and sanitary. Each rack has a central opening 14, 15, respectively through which a removable and upwardly extending display post 20 extends. The lower end of the display post is inserted in the opening 7 in the bottom and the post itself is made in sections 20a, 20b and 20c held together by the stub shafts 21 snugly fit into the bottom end of each section, so that the display post can be easily assembled or disassembled.

As the bin may contain ice for cooling of the produce therein, a drainage plug or valve 24 is provided at the bottom of the bin and this plug or valve can be removed or opened to permit drainage of the melted ice from the bin when the bin has been moved to a suitable location for that purpose, such as over a drain in the floor.

In order to render the bin portable for being moved about the store or other area where it is located, a removalbe wheel assembly 30 is provided in the form of a caster wheel ring assembly having caster wheels 31 mounted in the lower part of a ring 32 and adapted to engage the floor. The ring 32 is formed of tubular steel and is preferably plated to render it waterproof. The downwardly extending vertical shoulder 9a around the bottom corner of the bin is adapted to be firmly slipped into the ring 32 in a snug manner to prevent accidental displacement of the bin from the ring and yet the bin can be pulled from the ring assembly when desired. Thus, the caster wheel assembly 30 can be used for other bins once they are located at the proper location or when it is desired to store them, it being unnecessary to provide a ring assembly for each bin. The ring is located generally directly under the side wall means which provides good bearing and stability for the bin and firmly supports the bin even when loaded.

Figure 5:
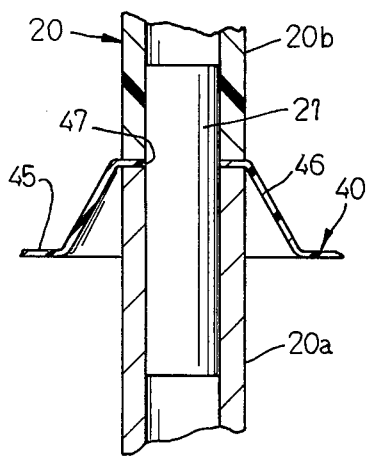
FIG. 5 is an enlarged, fragmentary, sectional view of the upper central portion of the bin assembly shown in FIG. 3.
Figure 3:
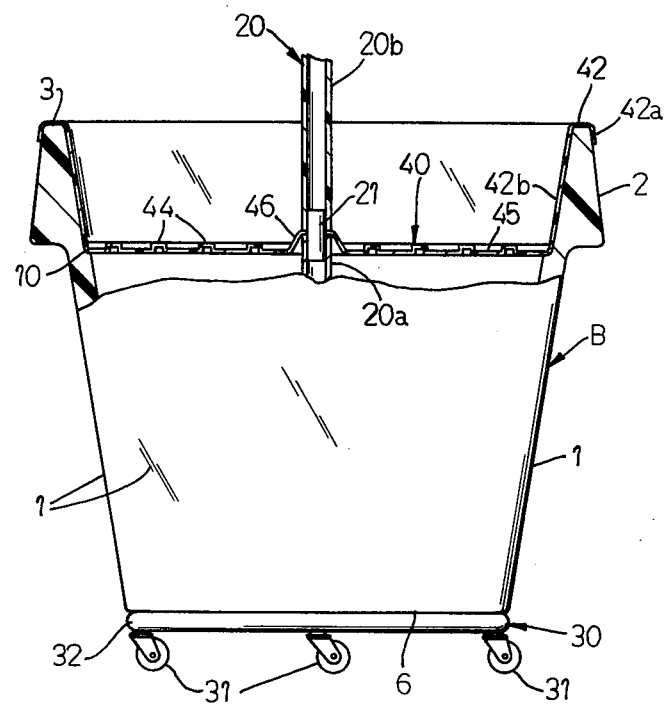
FIG. 3 is a side elevational view of the bin shown in FIG. 1, with certain parts being removed, broken away or in section for the sake of clarity.

A removable cover tray 40 (FIGS. 3 and 4) is provided for the bin and is preferably formed of plastic and by vacuum forming. The tray has a peripheral, inverted U-shaped flange means 42 which extends, as shown in FIG. 3, over the top edge 3 of the bin and its outermost leg 42a downwarfdly over the outside of the bin, and its inner wall 42b extends downwardly inside of the bin and along the reinforcing portion 2 and in snug engagement therewith. Reinforcing ribs 44 extend across the tray to reinforce and rigidify it, the ribs being shown as extending diagonally across the generally rectangular tray. The tray furthermore has a raised central portion 46 (FIG.5) having an opening 47 through which the display post also extends. More particularly, the top end of the bottom section 20a is diametrically larger than opening 46 to permit the tray to rest on and be supported by the section 20a. The stub shaft 21 extends through opening 46 to receive the adjacent upper post section 20b.

The tray furthermore is formed so as to permit drainage of water therefrom which may accumulate from the produce or other material on the tray and this drainage means includes grooves 48 formed across the ribs 44 and which permit the water to flow to the hole 49 in the tray and then downwardly into the bin for ultimate passage through the valve 24.

The removable cover tray thereby provides a support for any material that is desired to be displayed at the top of the bin and the cover tray also performs the function of preventing laterally outward displacement of the side wall means of the bin and breakage thereof which may otherwise occur due to the weight of the material or ice in the bin.

RECAPITULATION

The present invention provides a portable storage bin which is molded from a lightweight insulating material such as expandable polystyrene that is highly mobile and finds particular utility in supermarkets and for storing and transporting produce about the marketplace. The bin provides an attractive display for food or the like and which can be readily moved to strategic locations. The bin provides a refrigerated storage unit for keeping perishables cool and provides drainage for the melted ice. The bin is rendered mobile by means of the easily removable or quickly assembled caster ring assembly, which assembly can be utilized for any number of bins. The bins can also be readily stacked and nested together for storage in a space-saving manner when not in use. Various capacities of the bin are provided by means of the plurality of removable shelves which are easily inserted and removable from the interior of the bin. A removable cover tray is provided for resting on top of the bin and reinforcing its upper portion so as to prevent lateral expansion and breakage of the side walls of the bin due to the weight and pressure of the ice and/or produce which is loaded within the bin. Both the removable tray and the removable racks have central openings passing therethrough for accommodating a removable display post that extends upwardly from the bottom of the bin in which it is removably inserted. The bin provided by the present invention can be used as an ice chest and displays perishable produce at strategic locations such as close to the check-out counter where the customer traffic is heavy. The bin can be wheeled from the coolers and freezers for easy storage of the produce over-night.

I claim:

1. A portable, lightweight, and nestable storage bin molded from expandable polystyrene and comprising; side wall means, a closed bottom and an open top, said side wall means terminating in an upper edge and also having a thicker, reinforcing portion so as to rigidify and strenghten said upper edge of said bin, said side wall means also having an interior inwardly turned shoulder intermediate the height of said side wall means, a removable rack supported on said shoulder for supporting material in said bin, said bin adapted to receive ice to maintain said material at a reduced temperature, said bottom also having wheel mounting means on the underside thereof, said mounting means comprising an annular recess formed completely around the periphery of said bottom and defining a generally vertical cylindrical shoulder and also defining a generally horizontal shoulder, a removable wheel assembly having floor engaging caster wheels thereon, and said wheel assembly including a ring into which said vertical cylindrical shoulder is inserted by being slipped downwardly therein and on which generally horizontal shoulder the ring bears in supporting relationship, said mounting means on said bin bottom adapted to be quickly removably mounted on said assembly for rendering said bin mobile.

2. A portable, lightweight, and stackable storage bin fabricated from expandable polystyrene and comprising; side wall means, a closed bottom and an open top, said side wall means having an interior inwardly turned shoulder, a removable rack on said shoulder for supporting material in said bin, said bin adapted to receive ice in the lower portion thereof to maintain said material at a reduced temperature, said bottom also having wheel mounting means on the underside thereof, a removable wheel assembly having floor engaging caster wheels thereon, said mounting means on said bin bottom adapted to be mounted on said assembly for rendering said bin mobile, said mounting means comprising an annular recess formed completely around the periphery of said bottom and defining a generally vertical cylindrical shoulder and also defining a generally horizontal shoulder, and said wheel assembly including a ring into which said vertical cylindrical shoulder is inserted by being slipped downwardly therein and on which generally horizontal shoulder the ring bears in supporting relationship, said side wall means of said bin terminating at its upper edge in a thicker, reinforcing portion so as to rigidify and strenghten the upper edge of said bin, and a removable cover tray having a peripheral flange means which extends over said upper bin edge and then downwardly around the periphery thereof so as to provide a reinforcing means for said bin and prevent lateral expansion and consequent breakage thereof, said tray having a central portion located downwardly in said bin for the reception of material to be carried thereby.

3. The storage bin set forth in claim 2 including a valve locate in said bottom for draining water from said bin, and said cover tray has drainage means therein for permitting water to be drained therefrom and downwardly through said bin and for discharge through said valve.

4. The storage bin as set forth in claim 2 further characterized in that said side wall means tapers inwardly and downwardly and whereby a multiplicity of bins may be stacked and nested relative to one another.

5. The storage bin set forth in claim 2 further characterized in that said removable cover tray has reinforcing ribs formed integrally therewith and extending across its width to prevent distortion of said tray.

6. A portable, lightweight, and stackable storage bin fabricated from expandable polystyrene and comprising; side walls means, a closed bottom and an open top, said wall means having an interior inwardly turned shoulder, a removable rack on side shoulder for supporting material in said bin, said bin adapted to receive ice in the lower portion thereof to maintain said material at a reduced temperature, said bottom having a valve therein for draining water fom said bin, said bottom also having a continuous downwardly extending annular shoulder and a continuously and generally horizontal shoulder, a removable ring having floor engaging caster wheels thereon, said downwardly extending shoulder means on said bin adapted to be quickly removably slipped downwardly into said ring for rendering said bin mobile, siad bottom also having an upwardly facing and generally centrally located opening for the support and reception of a removable display post extendable to a location above said bin, said side wall means of said bin terminating at its upper edge in a thicker, reinforcing portion so as to rigidify and strenghten the upper edge of said bin, and a removable cover tray having a peripheral flange means which extends over said upper bin edge and then downwardly around the periphery thereof so as to provide a reinforcing means for said bin and prevent lateral expansion and consequent breakage thereof, said tray having a central portion extending downwardly into said bin for the reception of material to be carried and displayed thereby, said tray having drainage means therein tfor permitting water to be drained therefrom and downwardly into said bin for ultimate drainage through said valve.

7. The storage bin as set forth in claim 6 further characterize in that said side wall means tapers inwardly and downwardly and whereby a multiplicity of bins may be stacked and nested relative to one another.

8. The storage bin as set forth in claim 6 further characterize in that said removable rack and said tray have central openings through which said removable display post extends.

9. The storage bin set forth in claim 6 further characterized in that said removable cover tray has reinforcing ribs formed integrally therewith and extending across its width to prevent distortion of said tray.

10. A portable, lightweight, and stackable storage bin fabricated from expandable polystyrene and comprising; side wall means, said side wall means tapering inwardly and downwardly whereby a multiplicity of bins may be stacked and nested relative to one another, a closed bottom and an open top, said side wall means having an interior inwardly turned shoulder, a removable rack on said shoulder for supporting material in said bin, said bin adapted to receive ice in the lower portion thereof to maintain said material at a reduced temperature, said bottom having a valve therein for draining water from said bin, said bottom also having a downwardly extending annular shoulder, a removable ring having floor engaging caster wheels thereon, said downwardly extending shoulder means on said bin adapted to be set into said ring for rendering said bin mobile, said bottom also having an upwardly facing and generally centrally located opening for the reception of a removable display post extendable to a location above said bin, said side wall means of said bin terminating at its upper edge in a thicker, reinforcing portion so as to rigidify and strenghten the upper edge of said bin, and a removable cover tray having a peripheral flange means which extends over said upper bin edge and then downwardly around the periphery thereof so as to provide a reinforcing means for said bin and prevent lateral expansion and consequent breakage thereof, said removable rack and said tray having central openings through which said removable display post extends, said tray having a central portion extending downwardly into said bin for the reception of material to be carried and displayed thereby, said central portion of said removable cover tray having reinforcing ribs formed integrally therewith and extending across its width to prevent distortion of said tray, said tray having drainage means therein for permitting water to be drained therefrom and downwardly into said bin for ultimate drainage through said valve.

* * * * *